US010997026B1

(12) United States Patent
Kamran et al.

(10) Patent No.: US 10,997,026 B1
(45) Date of Patent: May 4, 2021

(54) DYNAMIC DATA PLACEMENT FOR REPLICATED RAID IN A STORAGE SYSTEM

(71) Applicant: Dell Products L.P., Round Rock, TX (US)

(72) Inventors: Lior Kamran, Rishon LeZion (IL); Alex Soukhman, Raanana (IL); Hillel Costeff, Oranit (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 58 days.

(21) Appl. No.: 16/669,069

(22) Filed: Oct. 30, 2019

(51) Int. Cl.
*G06F 12/00* (2006.01)
*G06F 11/10* (2006.01)
*G06F 11/07* (2006.01)
*G06F 11/20* (2006.01)
*G06F 3/06* (2006.01)

(52) U.S. Cl.
CPC ........ *G06F 11/1096* (2013.01); *G06F 3/0614* (2013.01); *G06F 3/0646* (2013.01); *G06F 3/0689* (2013.01); *G06F 11/076* (2013.01); *G06F 11/2056* (2013.01); *G06F 2201/855* (2013.01)

(58) Field of Classification Search
CPC ............... G06F 11/1096; G06F 11/076; G06F 11/2056; G06F 3/0614; G06F 3/0646; G06F 3/0689; G06F 3/0655; G06F 2201/855
See application file for complete search history.

(56) References Cited

U.S. PATENT DOCUMENTS 8,401,997 B1 * 3/2013 Tawri .................. G06F 11/2064
707/655

* cited by examiner

*Primary Examiner* — Shawn X Gu
(74) *Attorney, Agent, or Firm* — Daly, Crowley, Mofford & Durkee, LLP

(57) ABSTRACT

A method is disclosed for destaging data to a storage device set that is arranged to maintain M replicas of the data, the storage device set having M primary storage devices and N secondary storage devices, the method comprising: detecting a destage event; and in response to the destage event, destaging the data item that is stored in a journal, the destaging including: issuing M primary write requests for storing the data item, each of the M primary write requests being directed to a different one of the M primary storage devices; in response to detecting that L of the primary write requests have failed, issuing L secondary write requests for storing the data item, each of the L secondary write requests being directed to a different secondary storage device; updating a bitmap to identify all primary and secondary storage devices where the data item has been stored.

20 Claims, 8 Drawing Sheets

US 10,997,026 B1

DYNAMIC DATA PLACEMENT FOR REPLICATED RAID IN A STORAGE SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

According to aspects of the disclosure, a method for destaging data to a storage device set that is arranged to maintain M replicas of the data, the storage device set having M primary storage devices and N secondary storage devices, the method comprising: detecting a destage event; and in response to the destage event, destaging the data item that is stored in a journal, the destaging including: issuing M primary write requests for storing the data item, each of the M primary write requests being directed to a different one of the M primary storage devices; in response to detecting that L of the primary write requests have failed, issuing L secondary write requests for storing the data item, each of the L secondary write requests being directed to a different secondary storage device; updating a bitmap to identify all primary and secondary storage devices where the data item has been stored; wherein M is an integer greater than one, L is an integer greater than or equal to one, and N is an integer greater than or equal to one.

According to aspects of the disclosure, a system is disclosed for destaging data to a storage device set that is arranged to maintain M replicas of the data, the storage device set having M primary storage devices and N secondary storage devices comprising: a memory; and a processor that is operatively coupled to the memory, the processor being configured to perform a process including the operations of: detecting a destage event; and in response to the destage event destaging a data item that is stored in a journal, the destaging including: issuing M primary write requests for storing the data item, each of the M primary write requests being directed to a different one of the M primary storage devices; in response to detecting that L of the primary write requests have failed, issuing L secondary write requests for storing the data item, each of the L secondary write requests being directed to a different secondary storage device; updating a bitmap to identify all primary and secondary storage devices where the data item has been stored; wherein M is an integer greater than one, L is an integer greater than or equal to one, and N is an integer greater than or equal to one.

According to aspects of the disclosure, a non-transitory computer-readable storage medium is disclosed for storing one or more processor-executable instructions, which, when executed by at least one processor, cause the at least one processor to execute a process for destaging data to a storage device set that is arranged to maintain M replicas of the data, the storage device set having M primary storage devices and N secondary storage devices, the process including the steps of: detecting a destage event; and in response to the destage event, destaging a data item that is stored in a journal, the destaging including: issuing M primary write requests for storing the data item, each of the M primary write requests being directed to a different one of the M primary storage devices; in response to detecting that L of the primary write requests have failed, issuing L secondary write requests for storing the data item, each of the L secondary write requests being directed to a different secondary storage device; updating a bitmap to identify all primary and secondary storage devices where the data item has been stored; wherein M is an integer greater than one, L is an integer greater than or equal to one, and N is an integer greater than or equal to one.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
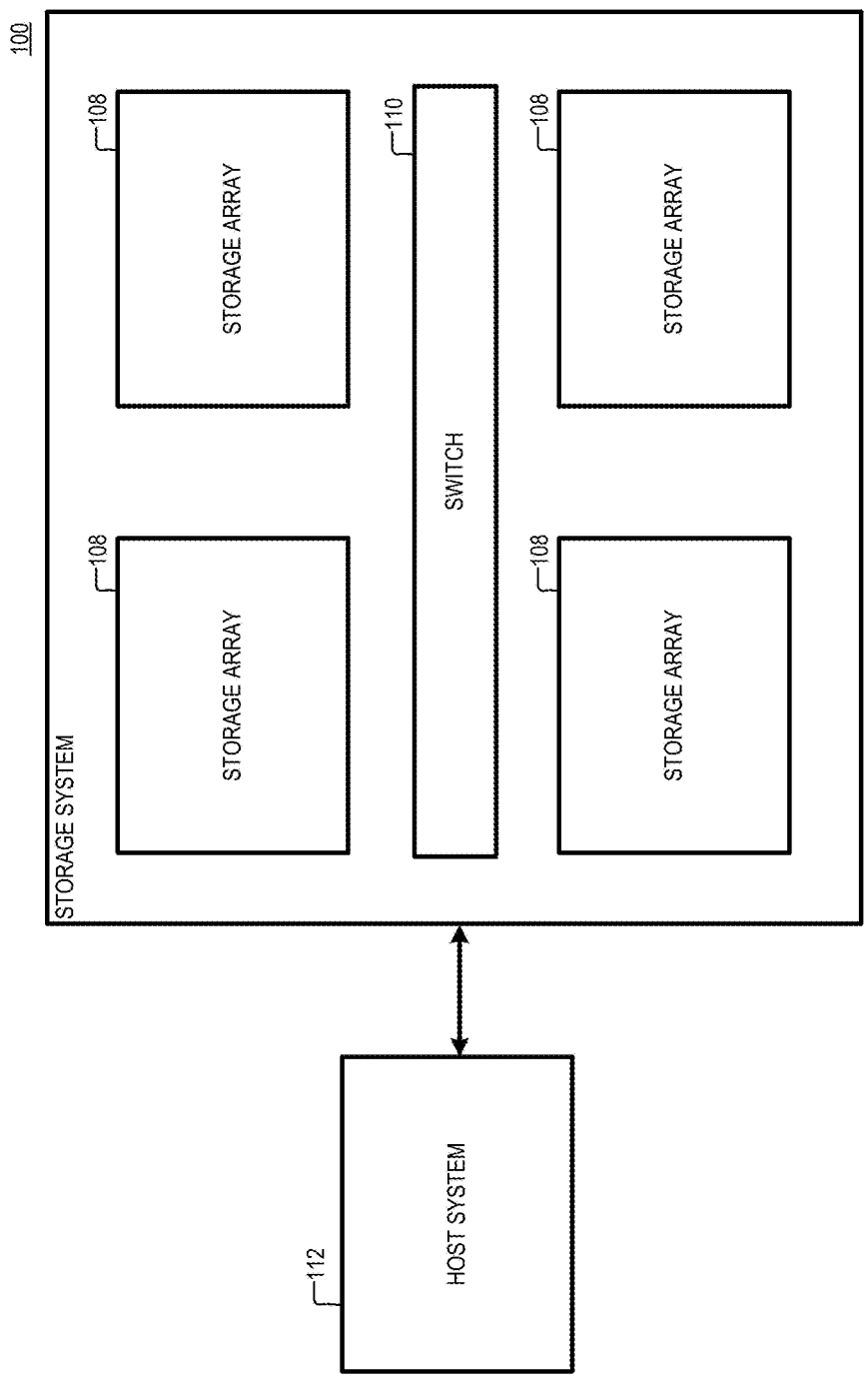
FIG. 1 is a diagram of an example of a distributed storage system, according to aspects of the disclosure.

FIG. 1 is a diagram of an example of a storage system 100, according to aspects of the disclosure. As illustrated, the storage system 100 may include one or more storage arrays 108 coupled to one another via a network switch 110. The storage system 100 may include a content-based storage system and/or any other suitable type of distributed storage system. In operation, the storage system 100 may receive I/O requests from a host system 112, and it may fulfill these requests. Specifically, the storage system 100 may fulfill write requests by storing data associated with the write requests in one or more storage devices (e.g., Solid-State Drives (SSDs)) that are part of the storage system; and similarly, the storage system 100 may fulfill read requests by retrieving data that is stored in the one or more storage devices and providing the retrieved data to the host system 112. The manner in which read and write requests are fulfilled by the storage system 100 is discussed further below with respect to FIGS. 2-8.

Figure 2:
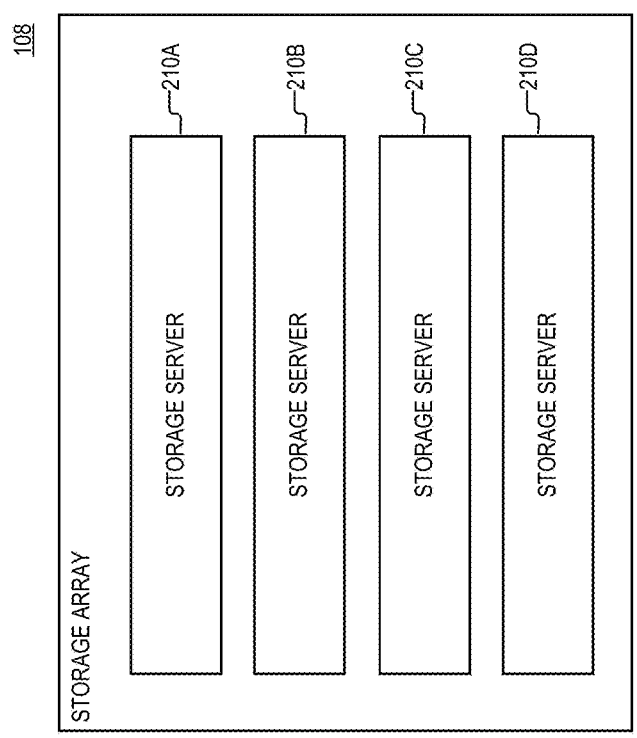
FIG. 2 is a diagram of an example of a storage array that is part of the distributed storage system of FIG. 1, according to aspects of the disclosure.

FIG. 2 is a diagram of a storage array 108 that is part of the storage system 100, according to aspects of the disclosure. The storage array 108 may include a plurality of storage servers 210 that are coupled to one another in a network (e.g., a mesh network). The network may include an InfiniBand network, a TCP/IP network, and/or any other suitable type of network. As is discussed further below, each of the storage servers 210 may be configured to execute one or more I/O providers. Each I/O provider may include one or more service processes for processing incoming I/O requests.

Figure 3A:
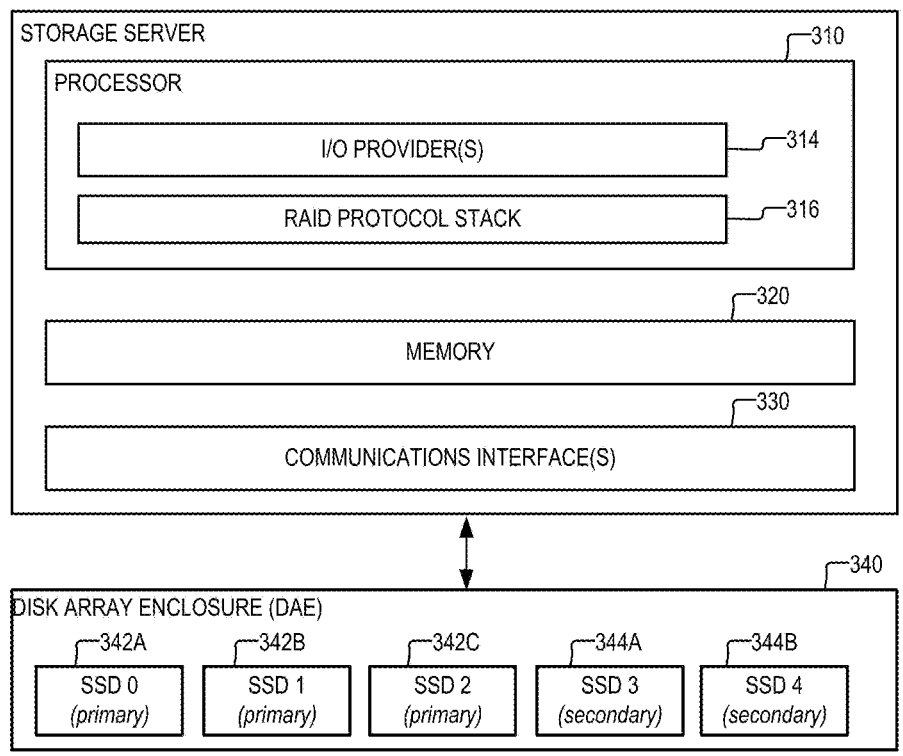
FIG. 3A is a diagram of an example of a storage server and a disk array enclosure that is part of the storage array of FIG. 2, according to aspects of the disclosure.
Figure 3B:
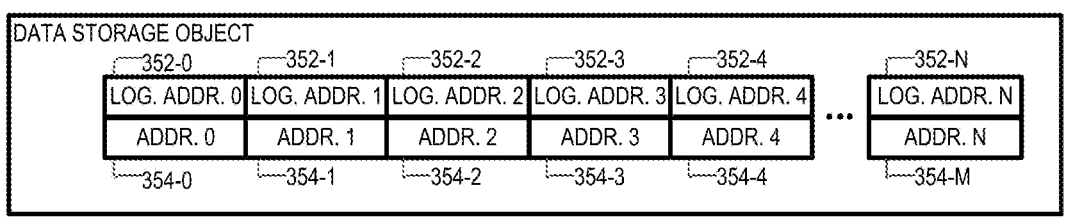
FIG. 3B is a diagram of an example of a data storage object, according to aspects of the disclosure.

FIG. 3A is a diagram of an example of a storage server 210 and a disk array enclosure (DAE) 340. FIG. 3B is a diagram of a storage object 350. The storage server 210, as the numbering suggests, is representative of any of the storage servers 210A-D in the storage array 108. As illustrated, the storage server 210 may include a processor 310, a memory 320, a communications interface(s) 330. The processor 310 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The memory 320 may include any suitable type of volatile and/or non-volatile memory. In some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The communications interface(s) 330 may include any suitable type of communications interface, such as one or more Ethernet adapters, one or more Wi-Fi adapters (e.g., 802.1414 adapters), and one or more Long-Term Evolution (LTE) adapters, for example.

According to the present example, the processor 310 may be configured to execute at least I/O provider(s) 314. The IO provider(s) 314 may include one or more processes for executing incoming I/O requests (e.g., write requests). Although in the present example, the I/O provider(s) 314 are implemented in software, alternative implementations are possible in which the I/O provider(s) 314 are implemented in hardware or as a combination of hardware and software. Stated succinctly, the present disclosure is not limited to any specific implementation of the I/O provider. As used throughout the disclosure, the term "I/O provider" may refer to any process which, alone or in combination with other processes, is configured to execute I/O requests that are received at the storage system 100, such as write requests for example.

According to the present example, the processor 310 may be configured to execute a protocol stack 316, which is used by the I/O provider(s) 314 to write data to the DAE 340. According to the present example, the protocol stack 316 is a Redundant Array of Independent Disks (RAID) protocol stack. However, alternative implementations are possible in which the protocol stack 316 implements another protocol for redundant data storage.

The DAE 340 may include M storage devices 342 and N storage devices 344. According to the present example, M is equal to 3. However, alternative implementations are possible in which M can be any positive integer greater than one. According to the present example, N is equal to 2. However, alternative implementations are possible in which N is any number greater than one. In this regard, it will be understood that the number of secondary storage devices 344 in the DAE 340 may be either smaller or larger than the number of primary storage devices 342. According to the present example, each of the storage devices 342 and 344 is a Solid State Drive (SSD). However, alternative implementations are possible in which any of the storage devices 342 and/or 344 includes another type of storage device, such as a non-volatile random-access memory (nvRAM) device, a hard disk, and/or any other suitable type of storage device.

The DAE 340 is arranged to operate in a mirrored configuration in which multiple mirror copies of user data in a volume (or another storage object) are stored in the storage devices 342/344. The DAE 340 is configured to store as many copies of the same volume (or another storage object) as there are primary storage devices 342 in the DAE 340. An example of a process for using the DAE 340 is discussed further below with respect to FIGS. 7-8. According to the present example, the DAE is configured to operate in a RAID 1 configuration. However, alternative implementations are possible in which the storage devices 342 are configured to operate in another mirrored disk configuration. Stated succinctly, the present disclosure is not limited to any specific implementation of the DAE 340.

FIG. 3B shows an example of a storage object 350. The storage object 350 is configured to map a first address space to a second address space. According to the present example, the storage object 350 is a hash-to-physical-address table. However, alternative implementations are possible in which the storage object is another storage object.

According to the present example, the term "storage object" may refer to any data structure that is at least partially used to store and retrieve data from one or more storage devices (e.g., SSDs). According to the present example, the storage object 350 may be used to implement (at least in part) a production volume that is mirrored on the DAE 340. According to the present disclosure, three copies of the volume (or portion thereof) are stored (or mirrored) on the DAE 340. For this reason, the volume can be referred to as "a triplicated volume," and the RAID layer 516 (see FIG. 5A), which is used to store data on the volume, is referred to as "triplicated RAID layer. However, the present disclosure is not limited thereto. In this regard, it will be understood that alternative implementations are possible in which a different number of copies of the volume are stored on the DAE 340.

According to the example, the storage object 350 is configured to map each of a plurality of addresses 352 to a respective address 354. According to the present example, each of the addresses 352 is a hash digest of a respective page of data. However, alternative implementations, in which each of the addresses 352 is a logical block address (LBA), and/or another type of address. As used in the context of storage object 350, the term "logical address" may refer to any identifier (e.g., number, string, or alpha-numerical string, etc.) that can be used to retrieve and store a data item on the DAE 340.

Figure 4:
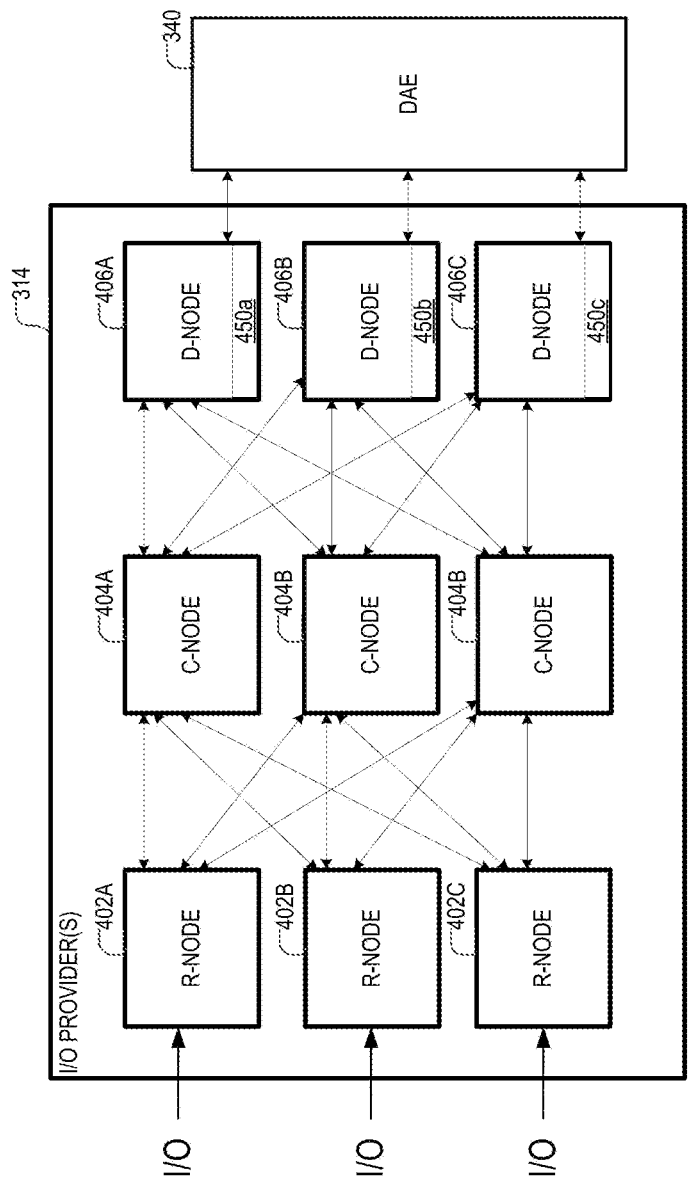
FIG. 4 is a diagram of an example of an I/O provider that is executed by the storage server of FIG. 3, according to aspects of the disclosure.
Figure 5:
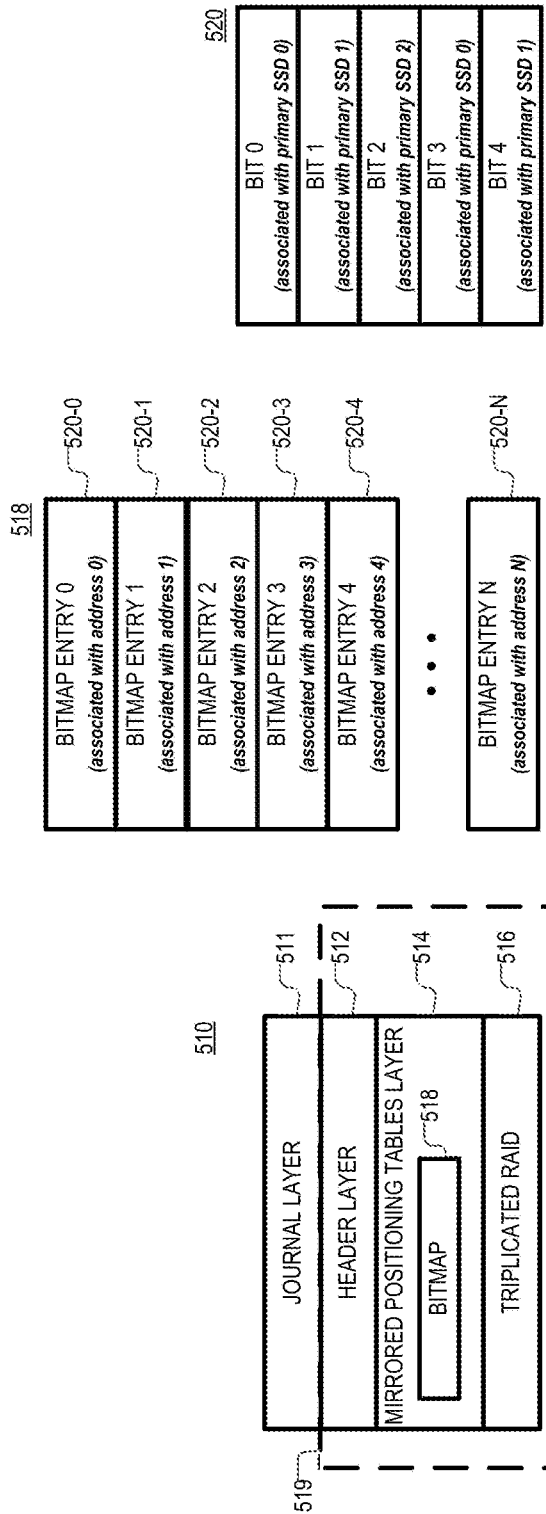
FIG. 5A is a diagram of an example of a processing stack, according to aspects of the disclosure.
FIG. 5B is a diagram of an example of a bitmap data structure, according to aspects of the disclosure.
FIG. 5C is a diagram of an example of a bitmap entry, according to aspects of the disclosure.

FIG. 4 is a diagram illustrating an example of one implementation of an I/O provider 400. The I/O provider 400 may be the same or similar to the I/O provider(s) 314, which is discussed above with respect to FIG. 3A. According to the present example, the I/O provider 400 includes I/O providers 402, 404, and 406, which are herein referred to as routing nodes (R-nodes), control nodes (C-nodes), and data nodes (D-nodes) respectively. The R-nodes, the C-nodes, and the D-nodes are connected to one another in a mesh network.

The R-nodes 402 may be configured to terminate I/O requests received at the storage system 100 and route them to appropriate C-nodes 404 and D-nodes 406 for further execution. In doing so, the R-nodes 402 may distribute a workload over multiple C-nodes 404 and D-nodes 406. In some implementations, any of the R-nodes 402 may be configured to write I/O requests (e.g., SCSI I/O requests) to selected ones of the C-nodes 404 for further processing.

The C-nodes 404 may be configured to control the execution of C-node commands supplied by the R-nodes 402. The C-node commands may be used to implement read requests, write requests, and/or any other suitable type of I/O request. In addition, each of the C-nodes 404 may maintain and manage key metadata elements (e.g., hash digests of user data, etc.). Each of the C-nodes 404 may be configured to receive C-node commands from the R-nodes and interact with the D-nodes 406 to execute the commands. In some implementations, each C-node 404 may maintain an address-to-hash (A2H) structure (not shown), a hash-to-D-node (H2D) structure (not shown), and a journal 450. As is known in the art, the A2H structure may map different logical data addresses (LDAs) to respective hash digests of user data that is stored at the LDAs, and the H2D table may map each of the hash digests to a respective D-node 406.

The D-nodes 406 may be configured to control the execution of D-node commands supplied by the C-nodes 404. Each of the D-nodes 406 may be attached to the DAE 340. Each of the D-nodes 406 may be configured to map hash digests received from the C-nodes (in provided C-node commands) to different physical locations in the DAE 340. In some implementations, the mapping may be performed by using a hash-to-physical address (H2P) structure (not shown) that is stored in the memory of any of the D-nodes 406. The H2P structure may map hash digests of user data to respective physical addresses in the DAE 340.

According to the present example, each of the D-nodes 406 may include a respective journal 450. Each journal 450 may implement a duplicated write amortization service based on lower-latency media than the storage devices 342 and/or 344. Small updates to a volume (which is implemented by using the storage device 342 and 344) are aggregated in the journal 406, and destaged to the storage devices 342 and/or 344 (e.g., destaged to the DAE 340). The journal 450 may supersede the DAE 340, such that if the data item exists in the journal 450 and in the DAE 340, the journal entry is used to retrieve the data item.

In operation, any of the R-nodes 402 may receive an I/O request that spans a range of logical data addresses (LDAs) from a multipath agent. According to the present example, the I/O request is a write request. As such, the I/O request may include a block of data and an opcode identifying an action that is required to be performed. In response to the request, the R-node 402 may identify a plurality of C-nodes 404. Afterwards, the R-node 402 may decompose the I/O request into a plurality of C-node commands and forward the C-node commands to the identified C-nodes 404 for further processing.

In operation, any of the C-nodes 404 may receive a C-node command that is generated by one of the R-nodes 402. The C-node command may include a data payload (e.g., user data) and an opcode identifying an action that is required to be performed. Upon receiving the C-node command, the C-node may identify one or more data items (e.g., pages of user data) contained in the C-node command. Next, the C-node may generate a respective hash digest for each of the data items. Next, the C-node may update its A2H and H2D structures in a well-known fashion. Next, the C-node 404 may generate one or more D-node commands, including the hash digests, and supply the generated D-node commands to corresponding D-nodes 406 for further processing.

In operation, any of the D-nodes 406 may receive a D-node command that is generated by one of the C-nodes 404. Next, the D-node 406 may identify a physical address in one of the storage devices in DAE 340 that corresponds to a hash digest contained in the D-node command. And finally, the D-node 406 may store the payload (e.g., user data) of the D-node command at a physical location that corresponds to the hash digest. The physical location may include a location in the DAE 340 and/or a location in the D-node's journal 450. In some implementations, upon receiving a D-node command, the D-node 406 may store the payload (e.g., user data) of the D-node command in its respective journal 450, after which the D-node 406 may destage the payload into the DAE 340. In some implementations, to destage data that is stored in its respective journal, any of the D-nodes 406 may execute one of a process 700 and a process 800, which are discussed further below with respect to FIGS. 7 and 8, respectively.

FIGS. 5A-C illustrate an example of a processing stack 510, according to aspects of the disclosure. An instance of the processing stack 510 may be executed on each of the D-nodes 406, which are discussed above with respect to FIG. 4. The processing stack 510 may be used by the D-nodes 406 to store data in their respective journals 450 and destage this data to the DAB 340. As illustrated, the processing stack 510 may include journal layer 511, a headers layer 512, a mirrored positioning tables layer 514, and a RAID layer 516. The layer 511 may include logic implementing any of the journals 450. The layer 512 may implement logic for storing and retrieving bootstrap data that is used to locate one or more positioning tables for the layer 516. The layer 514 may implement logic for storing and retrieving triplets of pairs (drive ID, offset), which corresponds to the location of three copies of every "section" (a group of pages e.g. 64 pages) in the DAE 340. This data is updated only when one of the storage devices 342 and/or 344 fails (i.e. during triplicated RAID rebuild process) or when a new storage device is added to the DAE 340 (i.e. during triplicated RAID Integrate process). The triplets of pairs may be mirrored across all storage devices 342 and/or 344, and kept consistent by the journal layer 511. The layer 516 may include an offset-based API to the "pages" inside the sections of the DAE 340, thereby allowing for the writing and reading of data from a given offset. The offset based API may be called when data is desired to be destaged from any of the journals 450 to the DAE 340. According to the present example, each of the layers 511-518 is implemented in software. However, alternative implementations are possible in which any of the layers 511-518 are implemented in hardware or as a combination of hardware and software.

In some implementations, the layers 512-516 may form at least a portion of a RAID stack 519. The RAID stack 519 may be the same or similar to the protocol stack 316, which is discussed above with respect to FIG. 3A. The layers 512-516 may be the same or similar to layers found in other known RAID stack implementations. However, unlike such RAID stack implementations, the mirrored positioning tables layer 514 may include a bitmap data structure 518 (hereinafter "bitmap 518"). As used in the present disclosure, the term RAID stack may refer to any block-layer logic for retrieving and storing data on a RAID-array.

FIG. 5B shows the bitmap 518 in further detail. As illustrated in FIG. 5B, the bitmap 518 may include a plurality of entries 520. Each of the entries 520 may be associated with a different respective address 352 in the storage object 350. For example, entry 520-0 may be associated with address 352-0 in the storage object 350; entry 520-1 may be associated with address 352-1 in the storage object 350; entry 520-2 may be associated with address 352-2 in the storage object 350; entry 520-3 may be associated with address 352-0 in the storage object 350; entry 520-4 may be associated with address 352-4 in the storage object 350; and entry 520-*n* may be associated with address 352-*n* in the storage object 350.

Each of the entries 520 may be used to identify the storage devices 342 and/or 344 that are used to mirror a particular address 352 in the storage object 350. According to the present disclosure, an address (e.g., a logical address) is "mirrored" if multiple copies of the data stored at the address are maintained in one or more storage devices. For example, a logical data address (LDA) in a volume would be mirrored if multiple copies of the data stored at the LDA are maintained in one or more storage devices. As another example, a hash digest (which is used to store data in a content-addressable storage system) may be mirrored, if multiple copies of user data are maintained in one or more storage devices. According to the present disclosure, an address (e.g., a logical address, a hash digest, etc.) is mirrored on a given device, if a copy of the data item stored at this address is stored on the given storage device. According to the present disclosure, a data item is stored at a particular address (e.g., a logical address) when the address can be used to retrieve the data time (e.g., by using the address to access a storage device and/or using the address to obtain another address that is subsequently used to access the storage device).

More particularly, each of the entries 520 may include as many bits as the total number (i.e., N+M) of storage devices 342/344 in the DAE 340, which is 5 in the present example. Each of the bits in any of the entries 520 may be associated with a different storage device 342/344. More specifically, bit 0 in each of the entries 520 may be associated with storage device 342*a*, bit 1 in each of the entries 520 may be associated with storage device 342*b*, bit 2 in each of the entries 520 may be associated with storage device 342*c*, bit 3 in each of the entries 520 may be associated with storage device 344*a*, and bit 4 in each of the entries 520 may be associated with storage device 344*b*.

The value of any of the bits in a given entry 520 may indicate whether the given entry's 520 corresponding address 352 is mirrored (e.g., stored) on the bit's associated storage device 342/344. For example, if bit 0 of a given entry 520 is set to '1' this may indicate that the given entry's corresponding address is mirrored on storage device 342*a*; on the other hand, if bit 0 of the given entry 520 is set to '0' this may indicate that the given entry's corresponding address is not mirrored on storage device 342*a*. If bit 1 of a given entry 520 is set to '1' this may indicate that the given entry's corresponding address is mirrored on storage device 342*b*; on the other hand, if bit 1 of the given entry 520 is set to '0' this may indicate that the given entry's corresponding address is not mirrored on storage device 342*b*. If bit 2 of a given entry 520 is set to '1' this may indicate that the given entry's corresponding address is mirrored on storage device 342*c*; on the other hand, if bit 2 of the given entry 520 is set to '0' this may indicate that the given entry's corresponding address is not mirrored on storage device 342*c*. If bit 3 of a given entry 520 is set to '1' this may indicate that the given entry's corresponding address is mirrored on storage device 344*a*; on the other hand, if bit 3 of the given entry 520 is set to '0' this may indicate that the given entry's corresponding address is not mirrored on storage device 344*a*. If bit 4 of a given entry 520 is set to '1' this may indicate that the given entry's corresponding address is mirrored on storage device 344*b*; on the other hand, if bit 4 of the given entry 520 is set to '0' this may indicate that the given entry's corresponding address is not mirrored on storage device 344*b*.

For example, if a given entry has the value of '11100', this may indicate that the corresponding address of the given entry 520 is mirrored on storage devices 342*a*, 342*b*, and 342*c*. As another example, if a given entry 520 has the value of '01101', this may indicate that the corresponding address of the given entry 520 is mirrored on storage devices 342*b*, 342*c*, and 344*b*. As yet another example, if a given entry 520 has the value of '00111', this may indicate that the corresponding address of the given entry 520 is mirrored on storage devices 342*c*, 344*a*, and 344*b*.

In operation, any of the D-nodes 406 may receive a command to store a particular data item (e.g., a page of data or another data block) in the DAE 340. In response to the D-node command, the data item may be stored in the journal 450 of the D-node 406. Afterwards, a destaging event may be generated within the D-node 406, and the D-node 406 may retrieve the data item from the journal and mirror the data item onto the DAE 340. To mirror the data item, the D-node may issue a different write request to each of the storage devices 342, which instructs the storage device 342 to store the data item. If each of the write requests is completed successfully, a copy of the data item becomes stored in each of the storage devices 342, and the destaging of the data item is considered completed. When the destaging of the data item is completed, the D-node command is also considered completed, and the sender of the D-node command (e.g., a C-node) is notified of its completion.

On the other hand, if any of the write requests times out (e.g., due to an error or overload of the storage device 342 which receives the request), the destaging of the data item (cannot be considered completed unless the data item is stored on one of the storage devices 344 (instead of being stored on the timed-out storage device 342). For example, consider a scenario in which an attempt to write a data item to storage device 342*a* fails and attempts to write the same data item to storage devices 342*b* and 342*c* succeed. In this scenario, the D-node 406 may issue another write request (for the same data item) to storage device 344*a*. As a result, the data item may be copied to storage device 344*a* instead of being stored in storage device 342*a*. After a copy of the data item is stored in storage device 344*a*, the destaging of the data item is considered completed. When the destaging of the data item is completed, the D-node command is also considered completed, and the sender of the D-node command (e.g., a C-node) is notified of its completion.

After the data item is copied to storage device 344*a*, the bitmap entry 520, which corresponds to the address associated with the D-node command, may be set to the value "01110." As noted above, this value indicates that the data item is mirrored onto storage devices 342*b*, 342*c*, and 344*a*.

As can be readily appreciated, the bitmap 518 may be used to maintain M replicas of a volume of data on K storage devices, where M<K. When one of the storage devices fails, a failover may be performed by using the bitmap 518 to identify storage devices where the respective replicas of a data item are stored, and retrieve the data item from the identified storage devices. In some respects, storing the data item on one of the secondary storage devices 344, when a write request to one of the primary storage devices 342 fails, may help increase the speed at which data is destaged from a journal to the DAE 340. Another option would be to reissue the write request to the same primary storage device 342, but re-issuing the write request may be slower and/or less effective (e.g., because the storage device is unavailable or experiencing an overload, which caused the first write request to fail on the first place, etc.) than writing the data item to one of the secondary storage devices 344.

Although in the example of FIGS. 5A-C, the bitmap data item is depicted as being implemented in the mirrored positioning layer 514 of a RAID stack 519, it will be understood that alternative implementations are possible in which the bitmap is implanted at a different location in a RAID stack and/or in a different type of a data storage stack. According to the present example, a respective instance of the bitmap 518 is stored in the respective memory of each of the D-nodes 406. However, alternative implementations are possible in which the bitmap 518 is stored in another memory location (e.g., in a memory shared by the D-nodes 406 or another type of shared memory). Stated succinctly, the present disclosure is not limited to any specific implementation of the bitmap 518.

According to aspects of the disclosure, a write request to one of the primary storage devices 342 may fail when that storage device becomes unavailable. A storage device (e.g., a primary storage device 342) may become unavailable, when the storage device (or a system using the storage device) performs background maintenance (e.g., garbage collection, etc.). Under such circumstances, the latency of the storage device may increase, and its bandwidth may decrease. The increased latency/decreased bandwidth may cause write requests issued to the storage device to fail and interfere with the operation of the processing stack (e.g., a processing stack 510) that is used to write data to the storage device. For example, if a triplicated RAID layer (e.g., the layer 516) in a processing stack has a hiccup, the journal layer (e.g., the layer 511) that depends on destaging to the triplicated RAID layer may also become completely full, which, in turn, may cause upstream client queues to fill up, and eventually even cause the client to fail.

While RAID 6 has an internal mechanism to cope with unavailable storage devices, RAID 1 lacks such a mechanism. In this regard, the present disclosure provides a mechanism for destaging data, which can be used to improve the operation of RAID 1 and/or other data mirroring protocols. As noted above, according to the mechanism, a set of primary storage devices (which is used to store mirrored data) is supplemented by one or more secondary storage devices. When a primary storage device is unavailable, and an attempt to destage a data item to the primary storage devices fails: (i) the data item is destaged to one of the secondary storage devices, and (ii) and a bitmap data structure is updated to indicate that the data item is stored on one of the secondary storage devices, rather than being stored on one of the primary storage devices. As noted above, storing the data item on one of the secondary storage devices, when a primary storage device is unavailable, may provide a faster route towards completing a destaging operation than waiting for the primary storage device to become available again, which may take seconds or even tens of seconds to happen. Further examples of the mechanism for destaging data are provided in the discussion of FIGS. 6-8 below.

Figure 6:
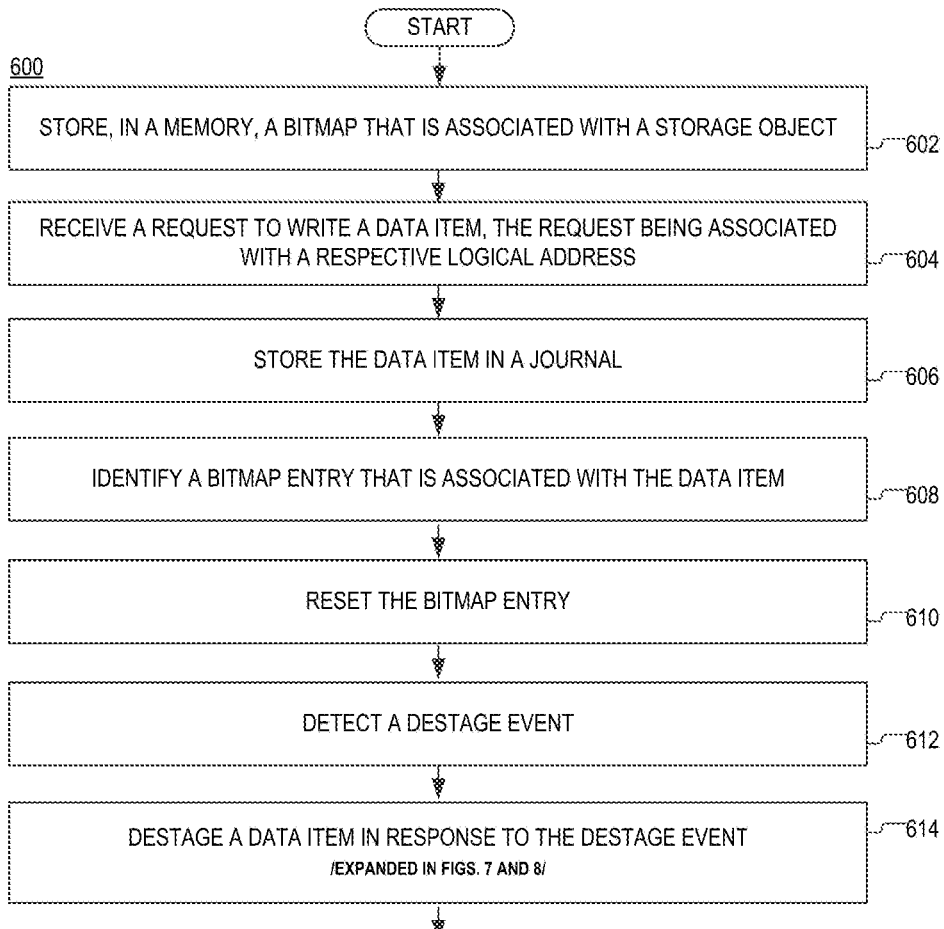
FIG. 6 is a flowchart of an example of a process, according to aspects of the disclosure.

FIG. 6 is a flowchart of an example of a process 600, according to aspects of the disclosure. At step 602, a bitmap data structure is stored in a memory. At step 604, a request is received to write a data item to permanent storage. The request may include a payload (i.e., the data item) and a logical address associated with the data item. The logical address may be a logical address that is identified in a data storage object such as the storage object 350. At step 606, the data item is stored in a journal. At step 608, an entry in the bitmap data structure is identified, which is associated with the logical address. At step 610, the identified bitmap entry is reset. Resetting the bitmap entry may include setting all bits in the bitmap entry to a first value (e.g., '0'). At step 612, a destage event is detected. At step 614, in response to the destage event, the data item is destaged from the journal onto a set of storage devices. In some implementations, step 614 may be performed in the manner discussed further below with respect to FIGS. 7 and 8.

Figure 7:
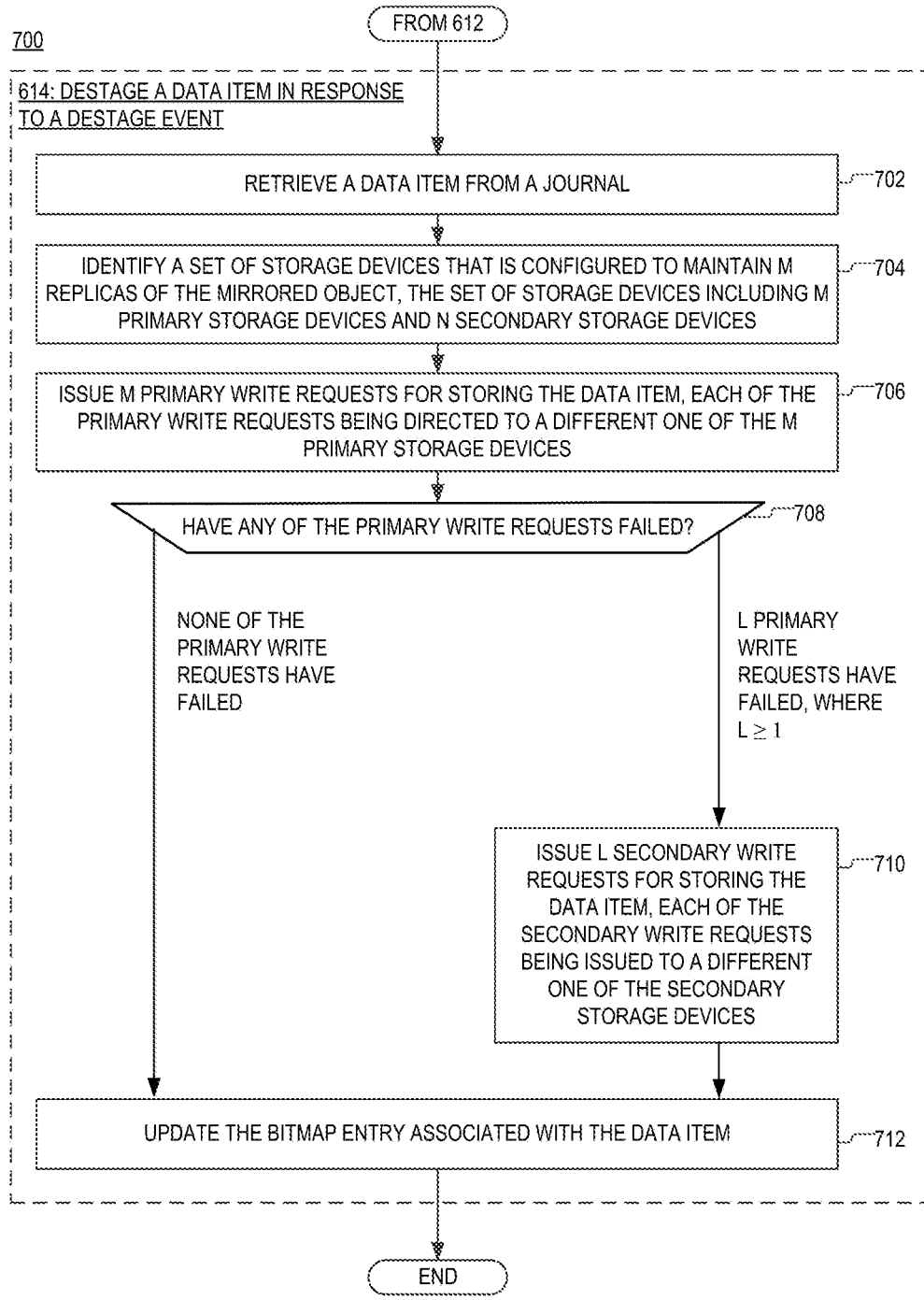
FIG. 7 is a flowchart of an example of a process, according to aspects of the disclosure.

FIG. 7 is a flowchart of an example of a process 700 for destaging a data item, as specified by step 614 of the process 600.

At step 702, the data item (received at step 604) is retrieved from the journal. At step 704, a set of storage devices is identified that includes M primary storage devices and N secondary storage devices, where M is an integer greater than one, and N is an integer greater than or equal to one. At step 706, M primary write requests are issued to the M primary storage devices, wherein: (i) each of the primary write requests is transmitted to a different one of the primary storage devices, and (ii) each of the primary write requests instructs the request's respective storage device to store the data item. At step 708, a determination is made if any of the M primary write requests has failed. If any of the primary write requests has failed, the process 700 proceeds to step 710. Otherwise, if all of the primary write requests were successful, the process 700 proceeds to step 712.

At step 710, L secondary write requests are issued, where L is an integer equal to the number of primary write requests that have failed. Each of the secondary write requests may be transmitted to a different secondary storage device, and it may instruct that storage device to store the data item. After the L write requests are completed successfully, the process 700 proceeds to step 712.

At step 712, the bitmap entry (identified at step 608) is updated to identify the storage devices where the data item has been stored as a result of executing steps 702-710. The bitmap entry may be updated by identifying any primary and secondary storage devices where the data item has been stored. Next, for each of the primary storage devices where the data item has been stored, a respective bit in the bitmap entry may be identified and set to a second value (e.g., '1'). Next, for each of the secondary storage devices where the data item has been stored, a respective bit in the bitmap entry may be identified and set to the second value (e.g., 1). After the bitmap entry is updated: (i) all bits in the bitmap entry which correspond to storage devices where the data item has been stored may be set to the second value (e.g., '1'), whereas all bits in the bitmap entry which correspond to storage devices where the data has not been stored remain set to the first value (e.g., '0').

Figure 8:
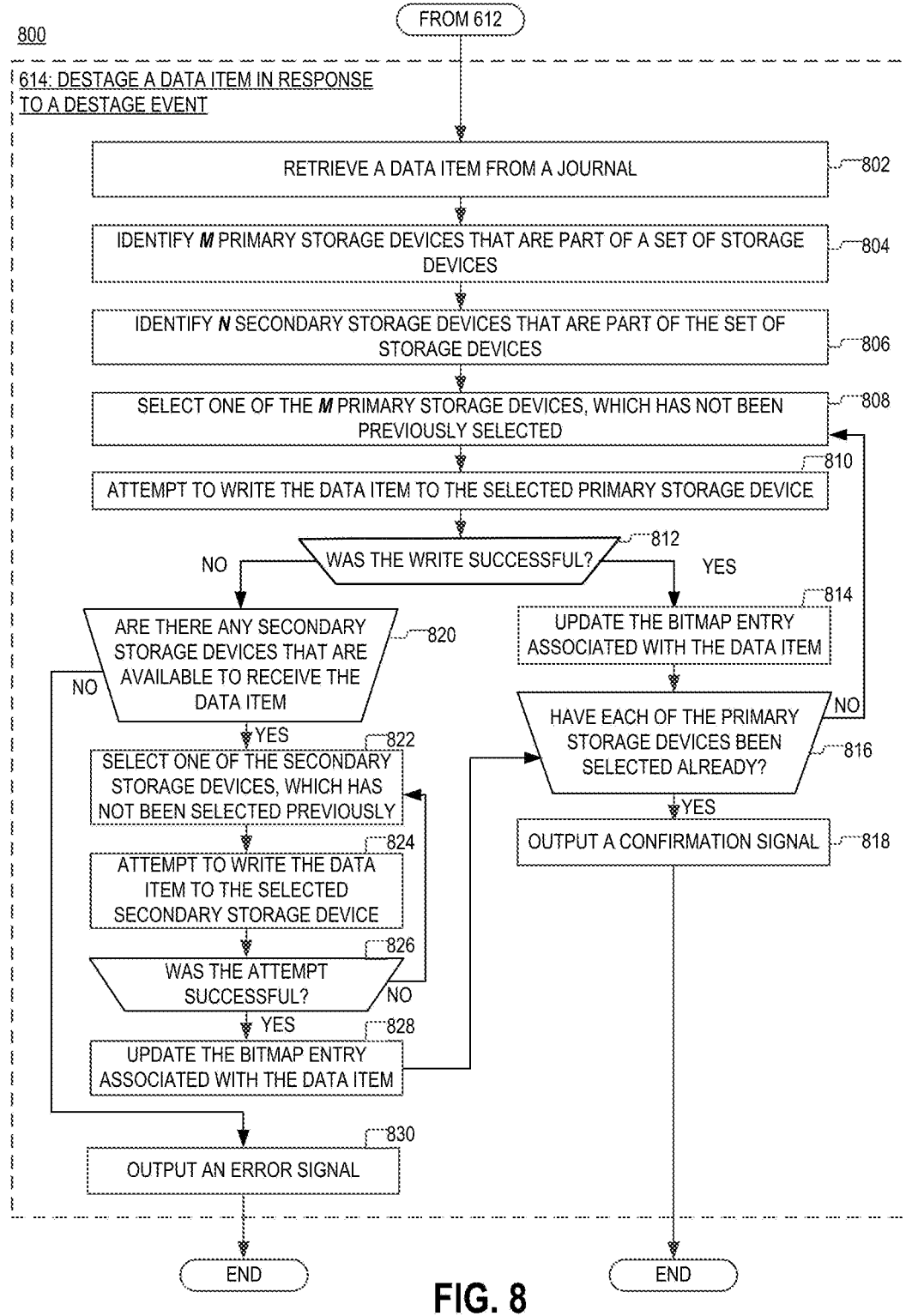
FIG. 8 is a flowchart of an example of a process, according to aspects of the disclosure.

FIG. 8 is a flowchart of an example of a process 800 for destaging a data item, as specified by step 614 of the process 800.

At step 802, the data item (received at step 604) is retrieved from the journal. At step 804, M primary storage devices are identified, where M is an integer greater than 1. At step 806, N secondary storage devices are identified, where N is an integer that is greater than or equal to one. At step 808, one of the primary storage devices is selected. At step 810, an attempt is made to write the data item to the selected primary storage device. At step 812, a determination is made if the attempt was successful. If the attempt was successful, the process 800 proceeds to step 814. Otherwise, if the attempt was unsuccessful, the process 800 proceeds to step 820.

At step 814, the bitmap entry is updated to indicate that the data item has been successfully stored in the selected primary storage device. In some implementations, updating the bitmap entry may include identifying a bit in the bitmap entry that is associated with the selected primary storage device, and setting the bit to a second value (e.g., '1').

At step 816, a determination is made if each the M primary storage devices 600 has been selected once already (e.g., during earlier iterations of the process 800). If each of the M primary storage devices has been selected already, the process 800 proceeds to step 818. Otherwise, if there are primary storage devices that remain to be processed, the process 800 returns to step 808, and another one of the primary storage devices is selected. Depending on the implementation, executing step 816 may ensure that: (i) an attempt is made to write the data item to each of the primary storage devices, and (ii) no multiple attempts are made to write the data item to any of the primary storage devices. In some implementations, step 816 may ensure that one and only one primary write request is issued to each of the primary storage devices.

At step 818, a confirmation signal is output that indicates that the data item has been destaged successfully. In some implementations, the confirmation may be transmitted to the sender of the request received at step 604.

At step 820, a determination is made if any of the N secondary storage devices are available to receive the data item. If there are available secondary storage devices, the process 800 proceeds to step 822. Otherwise, the process 800 proceeds to step 830. At step 822, one of the available secondary storage devices, which has not been selected previously, is selected. According to the present example, a storage device is selected to receive the data item if: (i) there are no previous failed attempts to store the data item on the secondary storage device, (ii) there are no previous successful attempts to store the data item on the secondary storage device. More specifically, a secondary storage device is considered available to receive a data item (in response to a failure of a most recent primary write request), if the data item has not already been written to the secondary storage device (in response to a failure of an earlier primary write request). In some implementations, steps 820 and 822 may be arranged to ensure that for each failed primary write request, the data item would be written to a different secondary storage device, and no multiple attempts would be made to write the data item to the same secondary storage device.

At step 824, an attempt is made to write the data item to the selected secondary storage device. At step 826, a determination is made if the attempt was successful. If the attempt was successful, the process 800 proceeds to step 828. Otherwise, if the attempt was unsuccessful, the process 800 returns to step 822, and another one of the available secondary storage devices (identified at step 820) is selected.

At step 828, the bitmap entry (identified at step 808) is updated to indicate that the data item has been successfully stored in the selected secondary storage device. In some implementations, updating the bitmap entry may include identifying a bit in the bitmap entry that is associated with the selected secondary storage device, and setting the bit to the second value (e.g., '1').

At step 830, a signal is outputting an error signal that indicates that the destaging of the data item cannot be completed successfully. In some implementations, the error signal may be output when the number L of failed primary write requests exceeds the number N of secondary storage devices. Additionally or alternatively, in some implementations, the error signal may be output when the number of operational secondary storage devices is less than the number of failed primary write requests. In some implementations, the confirmation may be transmitted to the sender of the request received at step 612

In some implementations, the process 600 may be performed a D-node, such as any of the D-nodes 406. Additionally or alternatively, in some implementations, the destage event (detected at step 612) may include any suitable type of event that triggers the transfer of a data item from a journal into another type of storage. The destage event may be generated by the device executing the process 600 or by another device. Additionally or alternatively, in some implementations, the write request (received at step 604) may be a D-node command. Additionally or alternatively, in some implementations, the data item (received at step 604) may be a page of data. Additionally or alternatively, in some implementations, the journal where the data item is initially stored (at step 606) may be the same or similar to any of the journals 450, which are discussed above with respect to FIG. 4. Additionally or alternatively, in some implementations, the bitmap data structure that is stored in memory (at step 602) may be the same or similar to the bitmap 518. Additionally or alternatively, in some implementations, the bitmap entry (identified at step 610) may be the same or similar to any of the bitmap entries 520. Additionally or alternatively, in some implementations, in some implementations, the primary storage devices (identified at steps 704 and 804) may be the same or similar to the primary storage devices 342. Additionally or alternatively, in some implementations, the secondary storage devices (identified at steps 704 and 806) may be the same or similar to the secondary storage devices 344.

According to the present example, a write request (to a given storage device) is considered failed when no confirmation that the write request has been executed successfully is received from the storage device within a predetermined time period. According to the present example, an attempt to write a data item to a storage device may include transmitting to the storage device a write request, which when received by the storage device causes the storage device to store the data item. Such an attempt may be considered failed when no confirmation that the write request has been executed successfully is received from the storage device within a predetermined time period. Although the process 600 is presented in the context of content-addressable storage (CAS), alternative implementations are possible in which the process 600 is executed by a component of a location addressed storage system.

According to the present disclosure, the term "address" may include any suitable type of identifier that is used by a storage system to track and/or identify the location (on a storage device) where a data item is stored. According to the present disclosure, an address is considered to be "mirrored" if multiple copies of the data item associated with the address are stored on different storage devices. As noted above, such copies may be identified by using a bitmap entry, which is associated with the address. Thus, the address may be used as a search key when performing a search of a bitmap data structure. Any a bitmap entry, returned in response to the search, may identify the storage devices where the data item associated with the address is copied. According to the present disclosure, a data item is considered "stored" at a particular logical address if the logical address is mapped to the physical location where the data item stored by one or more data structures, such as the storage object 350. As used throughout the disclosure, the term "node" may refer to a thread (or process) that is executed on a computing device (e.g., a storage server) and/or to the computing device itself. For the purposes of the present disclosure, the terms "process" and "thread" may be used interchangeably to refer to a sequence of processor-executable instructions that can be managed independently by a scheduler that is part of an operating system and/or another type of scheduler that is itself managed by the operating system scheduler. Although the examples of FIG. 1-8 are presented in the context of RAID, it will be understood that the processes techniques disclosed herein are not limited to RAID only. In this regard, it will be understood that the techniques and processes disclosed herein can be used in conjunction with any other suitable protocol for storing data.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for destaging data to a storage device set that is arranged to maintain M replicas of the data, the storage device set having M primary storage devices and N secondary storage devices, the method comprising:
   detecting a destage event; and
   in response to the destage event, destaging a data item that is stored in a journal, the destaging including:
      issuing M primary write requests for storing the data item, each of the M primary write requests being directed to a different one of the M primary storage devices;
      in response to detecting that L of the primary write requests have failed, issuing L secondary write requests for storing the data item, each of the L secondary write requests being directed to a different secondary storage device;
      updating a bitmap to identify all primary and secondary storage devices where the data item has been stored;
   wherein M is an integer greater than one, L is an integer greater than or equal to one, and N is an integer greater than or equal to one.

2. The method of claim 1, wherein the bitmap includes a plurality of entries, each entry including a plurality of bits, each of the plurality of bits being arranged to indicate whether a different one of the primary and secondary storage devices is used to store the data item.

3. The method of claim 2, wherein updating the bitmap includes:
   identifying an entry in the bitmap that is associated with the data item;
   setting, to a first value, each bit in the entry that is associated with a respective storage device where the data item is stored; and
   setting, to a second value, each bit in the entry that is associated with a respective storage device where the data item is not stored.

4. The method of claim 1, wherein the destaging of the data item is performed by executing a Redundant Array of Independent Disks (RAID) stack, the RAID stack being configured to manage the bitmap.

5. The method of claim 1, wherein the destaging of the data item is performed by a Redundant Array of Independent Disks (RAID) stack, and the bitmap is implemented in a Mirrored Positioning Tables layer of the RAID stack.

6. The method of claim 1, wherein the secondary write requests are issued only when one or more of the primary write requests have failed.

7. The method of claim 1, wherein the secondary write requests are issued only when a count of failed primary write requests is greater than one and less than or equal to N.

8. A system for destaging data to a storage device set that is arranged to maintain M replicas of the data, the storage device set having M primary storage devices and N secondary storage devices comprising:
   a memory; and
   a processor that is operatively coupled to the memory, the processor being configured to perform a process including the operations of:
   detecting a destage event; and
   in response to the destage event destaging a data item that is stored in a journal, the destaging including:
      issuing M primary write requests for storing the data item, each of the M primary write requests being directed to a different one of the M primary storage devices;
      in response to detecting that L of the primary write requests have failed, issuing L secondary write requests for storing the data item, each of the L secondary write requests being directed to a different secondary storage device;
      updating a bitmap to identify all primary and secondary storage devices where the data item has been stored;
   wherein M is an integer greater than one, L is an integer greater than or equal to one, and N is an integer greater than or equal to one.

9. The system of claim 8, wherein the bitmap includes a plurality of entries, each entry including a plurality of bits, each of the plurality of bits being arranged to indicate whether a different one of the primary and secondary storage devices is used to store the data item.

10. The system of claim 9, wherein updating the bitmap includes:
    identifying an entry in the bitmap that is associated with the data item;
    setting, to a first value, each bit in the entry that is associated with a respective storage device where the data item is stored; and
    setting, to a second value, each bit in the entry that is associated with a respective storage device where the data item is not stored.

11. The system of claim 8, wherein the destaging of the data item is performed by executing a Redundant Array of Independent Disks (RAID) stack, the RAID stack being configured to manage the bitmap.

12. The system of claim 8, wherein the destaging of the data item is performed by a Redundant Array of Independent Disks (RAID) stack, and the bitmap is implemented in a Mirrored Positioning Tables layer of the RAID stack.

13. The system of claim 8, wherein the secondary write requests are issued only when one or more of the M primary write requests have failed.

14. The system of claim 8, wherein the secondary write requests are issued only when a count of failed primary write requests is greater than one and less than or equal to N.

15. A non-transitory computer-readable storage medium storing one or more processor-executable instructions, which, when executed by at least one processor, cause the at least one processor to execute a process for destaging data to a storage device set that is arranged to maintain M replicas of the data, the storage device set having M primary storage devices and N secondary storage devices, the process including the steps of:
   detecting a destage event; and
   in response to the destage event, destaging a data item that is stored in a journal, the destaging including:
      issuing M primary write requests for storing the data item, each of the M primary write requests being directed to a different one of the M primary storage devices;
      in response to detecting that L of the primary write requests have failed, issuing L secondary write requests for storing the data item, each of the L secondary write requests being directed to a different secondary storage device;

updating a bitmap to identify all primary and secondary storage devices where the data item has been stored;

wherein M is an integer greater than one, L is an integer greater than or equal to one, and N is an integer greater than or equal to one.

16. The non-transitory computer-readable storage medium of claim 15, wherein the bitmap includes a plurality of entries, each entry including a plurality of bits, each of the plurality of bits being arranged to indicate whether a different one of the primary and secondary storage devices is used to store the data item.

17. The non-transitory computer-readable storage medium of claim 16, wherein updating the bitmap includes:
   identifying an entry in the bitmap that is associated with the data item;
   setting, to a first value, each bit in the entry that is associated with a respective storage device where the data item is stored; and
   setting, to a second value, each bit in the entry that is associated with a respective storage device where the data item is not stored.

18. The non-transitory computer-readable storage medium of claim 15, wherein the destaging of the data item is performed by a Redundant Array of Independent Disks (RAID) stack, the RAID stack being configured to manage the bitmap.

19. The non-transitory computer-readable storage medium of claim 15, wherein the destaging of the data item is performed by a Redundant Array of Independent Disks (RAID) stack, and the bitmap is implemented in a Mirrored Positioning Tables layer of the RAID stack.

20. The non-transitory computer-readable storage medium of claim 15, wherein the secondary write requests are issued only when one or more of the M primary write requests have failed.

* * * * *